US010303758B2

(12) United States Patent
Ben Ami et al.

(10) Patent No.: US 10,303,758 B2
(45) Date of Patent: May 28, 2019

(54) SYSTEMS METHODS AND COMPUTER-READABLE STORAGE MEDIA FOR REAL-TIME AUTOMATED CONVERSATIONAL AGENT

(71) Applicant: SERVICE FRIENDZ LTD., Bnei Barak (IL)

(72) Inventors: Shahar Ben Ami, Kfar Saba (IL); Ido Arad, Tel Aviv (IL); David Jonathan Saidon, Tel Aviv (IL); Yotam Rosenthal, Zichron Yaacov (IL); Roy Daya, Jerusalem (IL); Adi Berger, Tel Aviv (IL); Billy Tai Kwan Chu, Aurora (CA); Assaf Elovic, Tel Aviv (IL); Lee Levi, Tel Aviv (IL); Or Tzion Shahar, Tel Aviv (IL); Marianna Tsilov, Tel Aviv (IL)

(73) Assignee: SERVICE FRIENDZ LTD., Bnei Barak (IL)

( * ) Notice: Subject to any disclaimer, the term of this patent is extended or adjusted under 35 U.S.C. 154(b) by 0 days.

(21) Appl. No.: 15/709,477

(22) Filed: Sep. 20, 2017

(65) Prior Publication Data
US 2018/0089163 A1    Mar. 29, 2018

(30) Foreign Application Priority Data
Sep. 28, 2016 (GB) .................................. 1616477.4

(51) Int. Cl.
*G06F 17/00* (2019.01)
*G06F 17/27* (2006.01)
(Continued)

(52) U.S. Cl.
CPC ............ *G06F 17/27* (2013.01); *G06F 16/243* (2019.01); *G06F 17/2785* (2013.01); *G06N 3/08* (2013.01); *H04L 51/02* (2013.01); *G06F 16/00* (2019.01)

(58) Field of Classification Search
CPC ....... G10L 15/22; G10L 15/26; G10L 15/265; G10L 15/30; G10L 17/22; G10L 13/033;
(Continued)

(56) References Cited

U.S. PATENT DOCUMENTS 6,334,103 B1 * 12/2001 Surace .................. G10L 13/033
704/257
7,058,577 B2 * 6/2006 Surace .................. G10L 13/033
704/243

(Continued)

OTHER PUBLICATIONS

Evorus: A Crowd-powered Conversational Assistant Built to Automate Itself Over Time Ting-Hao (Kenneth) Huang, Joseph Chee Chang, and Jeffrey P. Bigham Language Technologies Institute and Human-Computer Interaction Institute Carnegie Mellon University arXiv:1801.02668v2 [cs.HC] Jan. 10, 2018 https://arxiv.org/pdf/1801.02668.pdf.

(Continued)

*Primary Examiner* — Edgar X Guerra-Erazo
(74) *Attorney, Agent, or Firm* — Mark David Torche; Patwrite Law

(57) ABSTRACT

Systems, methods and computer-readable storage media for natural language understanding in combination with real-time automated humanized verification in conversation agent messaging are described.

8 Claims, 8 Drawing Sheets

(51) Int. Cl.
*G06F 16/242* (2019.01)
*G06N 3/08* (2006.01)
*H04L 12/58* (2006.01)
*G06F 16/00* (2019.01)

(58) Field of Classification Search
CPC .............. G10L 2015/228; G10L 13/10; G10L 2015/225; G10L 15/00; G10L 21/0364; G10L 2021/0135; G10L 25/00; G06F 3/167
See application file for complete search history.

(56) References Cited

U.S. PATENT DOCUMENTS

| | | | | |
|---|---|---|---|---|
| 7,224,790 | B1* | 5/2007 | Bushey | H04M 3/5232 379/265.13 |
| 7,266,499 | B2* | 9/2007 | Surace | G10L 13/033 704/270 |
| 7,684,990 | B2* | 3/2010 | Caskey | G10L 15/22 704/255 |
| 7,702,500 | B2 | 4/2010 | Blaedow | |
| 7,933,389 | B2* | 4/2011 | Kumar | H04M 3/42153 379/68 |
| 8,185,448 | B1 | 5/2012 | Myslinski | |
| 8,433,572 | B2* | 4/2013 | Caskey | G10L 15/22 704/10 |
| 8,473,618 | B2* | 6/2013 | Spear | H04L 65/1066 709/227 |
| 9,055,147 | B2* | 6/2015 | Surace | G10L 13/033 |
| 9,634,855 | B2* | 4/2017 | Poltorak | G10L 13/033 |
| 9,990,176 | B1* | 6/2018 | Gray | G06F 3/167 |
| 2003/0154072 | A1* | 8/2003 | Young | H04M 3/51 704/9 |
| 2005/0091056 | A1* | 4/2005 | Surace | G10L 13/033 704/270.1 |
| 2006/0106612 | A1* | 5/2006 | Surace | G10L 13/033 704/270 |
| 2008/0103777 | A1* | 5/2008 | Surace | G10L 13/033 704/270 |
| 2008/0144783 | A1* | 6/2008 | Kumar | H04M 3/42153 379/88.13 |
| 2011/0283190 | A1* | 11/2011 | Poltorak | G10L 13/033 715/716 |
| 2012/0046948 | A1* | 2/2012 | Leddy | G10L 13/033 704/260 |
| 2012/0330934 | A1* | 12/2012 | Duboue | G06F 16/334 707/722 |
| 2017/0221483 | A1* | 8/2017 | Poltorak | G10L 13/033 |
| 2017/0221484 | A1* | 8/2017 | Poltorak | G10L 13/033 |
| 2018/0013709 | A1 | 1/2018 | Pittner | |

OTHER PUBLICATIONS

All together now—Introducing the Virtual Human Toolkit Hartholt et al., 2013 Institute for Creative Technologies—University of Southern California 12015 Waterfront Drive, Playa Vista, CA 90094, USA.

* cited by examiner

SYSTEMS METHODS AND COMPUTER-READABLE STORAGE MEDIA FOR REAL-TIME AUTOMATED CONVERSATIONAL AGENT

TECHNICAL FIELD

In general, the present invention pertains to the arts of telecommunications and/or computer networking. In particular, the invention relates to systems and methods for natural language understanding (NLU) in combination with real-time automated humanized virtual assistance messaging.

BACKGROUND ART

Real-time automated messaging interfaces are software components hosted inside a chat or messaging interfaces and that are used to interact with consumers in an automated way, with the aim of understanding and fulfilling a human request that arrives in a natural language form, while responding in the most appropriate way. The usefulness of real-time automated messaging interfaces is impacted greatly by its ability to correctly identify incoming messages and to respond accordingly in a way that simulates a conversation with an intelligent human agent. Current real-time automated messaging interfaces rely on predefined scripts and/or statistical analysis that attempt to identify what consumers mean in their messages to the real-time automated messaging interfaces. In cases where there is no identification of the exact user intent with all its associated parameters, the real-time automated messaging interface might provide a pre-defined fallback response. As human requests and responses can arrive in infinite number of variations, it is very difficult for a real-time automated messaging interface to have enough pre-defined scripts for each possible or even probable human response in each business context and to provide a useful solution for real-time automated messaging interface customers and companies that deploy them.

It is believed that the pertinent state-of-the-art is represented by: U.S. Pat. Nos. 9,280,610, 8,918,354, 9,224,152 and 6,434,549 as well as US patent applications Ser. No. US20140162241, US20140129651, US20150269586, US20130066693, US20140019435, US20100161592, US20130006637, US20130290342, US20160225370, US20140129651, US20090245500, US20160099892, US20120158620, US20160253313.

SUMMARY OF THE INVENTION

According to an aspect of the present invention, a method is provided for significantly improving real-time performance of a real-time automated messaging interface in terms of accuracy of understanding of the user's intent along with all of the associated mentioned and implied information in each and every step of the conversation. Using Real-Time crowd assisted method, a natural language understanding process reduces the list of possible user intents and data elements to a data set with only the most probable and highest certainty items according to various statistical, pattern matching, search, lexical, and other industry known methods. The short-list of probable intents, information entities, topics, sentiments, urgency and any other information to be extracted in high certainty is sent to crowd participants to vote on in real-time. This method allows the accuracy of the natural language understanding service when assisted by the real-time crowd optimization service to be above the combined accuracy score of all the probable results identified by the natural language understanding service as there is not only a choice between them with absolute certainly but also a possible addition of identifying further human inferred insights produced by the crowd participants if such insights are requested and the inherent ability to reject all of the given options for the given message element and request further analysis, information or options to make a certain extraction of the requested message element.

The method preferably comprises of a way to create challenges to the crowd in order to allow them to understand the challenge as a human and vote on the best answer in real-time experience to the real-time automated messaging interface user. The real-time element gives restrictions that the crowd assisted optimization service is a part of determining the next real-time automated messaging interface interaction with the user and not a background or a delayed service that is used for learning, data tagging or machine training purposes.

In certain embodiments the time-frame may a different number of seconds or minutes but such a time frame will impose a delay on the ongoing development of the conversation towards achieving the intent or goal of the user or of the real-time automated messaging interface business owner.

In certain embodiments, the real-time automated messaging interface may send scripted responses to maintain the flow of the conversation or request additional information for example about various parameters, terms and restrictions relating to the user intent or for the user to authenticate his or her identity. Such automated intermediary questions may keep the conversation flow and allow the real-time automated messaging interface to allow the real-time crowd optimization service more time and more information to enable it to perform in an optimal way. This is still a real-time response as the real-time automated messaging interface uses the crowd assisted optimization service to affect the conversation as it is being performed.

In certain embodiments the real-time automated messaging interface includes also a live agent that according to the flow of the conversation may be added to the conversation or the conversation may be transferred from an automated mode or crowd assisted automated mode to a live agent mode. In a preferred embodiment the crowd assisted optimization service uses a game interface to engage crowd members, making their response to challenges scored and creates a competition for performance regarding accuracy and speed.

In some embodiments, live agents may be used as crowd for the use of the real-time crowd optimization service as they are asked to provide a real-time vote on a time limited challenge. In certain embodiments, the method may further comprise forwarding the challenges to more than one crowd participant for quality assurance or other reasons. In certain embodiments, the method may further comprise forwarding the challenges to more than one crowd participant for analyzing other aspects of the message other than intent such as sentiment, urgency, or extracting known entities or parameters.

In certain embodiments, crowd challenges may be ongoing beyond the scope of a certain message or conversation and for example a challenge may be to identify a certain kind of information from multiple concurrent incoming messages. In certain embodiments, the method may further comprise creating incentives for crowd members in terms of performance scores, trophies, bonuses or other gamification tactics to encourage responses to have higher speed and accuracy. In the preferred embodiment, crowd participants are compensated for accurate responses sent within the real-time interaction delay limit.

In certain embodiments crowd members may be compensated in other ways or not compensated beyond their experience interacting with the challenges which may be rewarding to them in such a way as a game is rewarding to a player. In certain embodiments the crowd optimization service may be used also to test and evaluate the crowd members for the purpose of training or testing.

In certain embodiments, the method may further comprise of only sending the real-time crowd members less than optimal options to choose from as a checked alternative to the default best scored intent by the algorithmic natural language understanding module. In certain embodiments, where there is no way to create a short list of options to vote on, possible options may be divided into sets and sent concurrently to more than one crowd member to evaluate and vote on. This allows the real-time crowd assisted optimization service to provide high certainty assessment even when there is no relevant pre-processing done by an algorithmic natural language understanding service.

In certain embodiments, the method may further comprise of not using a natural language understanding module and using the real-time crowd voting service to vote on the user intent without prior analysis or classification. In certain embodiments, the method may further comprise of having the real-time crowd service produce textual response instead of voting on provided responses. In certain embodiments, the method may further comprise of using the real-time crowd optimization or voting system to correctly verify an intent in real-time for administrative use or to enrich the information about the call and not to use the intent discovery to directly respond back to the user.

Definitions

The term conversational agent as referred to herein shall be construed as encompassing any type of real-time messaging service, in a non-limiting manner including any dialog system is a computer system intended to converse with a human, with a coherent structure, inter alia employing text, speech, graphics, haptics, gestures and other modes for communication on both the input and output channel. The typical GUI wizard does engage in some sort of dialog, but it includes very few of the common dialog system components, and dialog state is trivial. There are many different architectures for dialog systems. What sets of components are included in a dialog system, and how those components divide up responsibilities differs from system to system. Principal to any dialog system is the dialog manager, which is a component that manages the state of the dialog, and dialog strategy. A typical activity cycle in a dialog system contains the following phases: the user speaks, and the input is converted to plain text by the system's input recognizer/decoder, which may include: automatic speech recognizer (ASR), gesture recognizer and handwriting recognizer. The text is analyzed by a Natural language understanding unit (NLU), which may include: proper name identification, part of speech tagging, syntactic/semantic parser. The semantic information is analyzed by the dialog manager, that keeps the history and state of the dialog and manages the general flow of the conversation. Usually, the dialog manager contacts one or more task managers, that have knowledge of the specific task domain. The dialog manager produces output using an output generator, which may include: natural language generator, gesture generator, layout engine. Finally, the output is rendered using an output renderer, which may include: text-to-speech engine (TTS), talking head robot or avatar.

The term real-time as referred to herein shall be construed as including a reasonable delay time acceptable in human to human interaction without breaking communication and stopping the immediate exchange of messages. In some preferred embodiments real-time is limited to 15 seconds after which no real-time intent optimization response will be given and the real-time automated messaging interface will assume the most likely or common algorithmic intent or request the user to clarify his or her intention.

Natural language processing (NLP) as referred to herein, relates to software programs and/or hardware field dedicated to a computer science field artificial intelligence and computational linguistics, concerned with the interactions between computers and human (natural) languages, and, in particular, concerned with programming computers to fruitfully process large natural language corporate. Challenges in natural language processing frequently involve natural language understanding (NLU), natural language generation (frequently from formal, machine-readable logical forms), connecting language and machine perception, dialog systems, or some combination thereof.

Whenever the terms "server", "agent", "system" or "module" is used herein, it should be construed as a computer program, including any portion or alternative thereof, e.g. script, command, application programing interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

The terms notification and/or message as used herein refer to a communication provided by a notification system to a message recipient device. A notification and/or message may be used to inform one or more recipient device, for example a notification and/or messages may be provided to the one or more recipient device, in a non-limiting manner using SMS texts, MMS texts, E-mail, Instant Messages, mobile device push notifications, HTTP requests, voice calls, telephone calls, Voice Over IP (VOIP) calls or alike, library function calls, API calls, URLs as well as any signals transferred, transmitted or relayed, as defined herein or any combination thereof.

The terms "transfer", "relaying", "transmitting", "forwarding", "retrieving", "accessing", "pushed" or similar refer to any interaction between agents via methods inter alia including: function calling, Application Programming Interface (API), Inter-Process Communication (IPC), Remote Procedure Call (RPC) and/or communicating using of any standard or proprietary protocol, such as SMTP, IMAP, MAPI, OMA-IMPS, OMA-PAG, OMA-MWG, SIP/SIMPLE, XMPP and/or SMPP.

Whenever in the specification hereunder and particularly in the claims appended hereto a verb, whether in base form or any tense, a gerund or present participle or a past participle are used, such terms as well as preferably other terms are to be construed as actual or constructive, meaning inter alia as being merely optionally or potentially performed and/or being only performed anytime in future. In addition, as used herein, the term "or" is an inclusive operator equivalent to the term "and/or," unless the context clearly dictates otherwise; whereas the term "and" as used herein is also an alternative operator equivalent to the term "and/or," unless the context clearly dictates otherwise.

It should be understood, however, that the particular definitions hereinabove are not to limit interpretation of the invention to the specific forms and examples but rather on the contrary are to cover all modifications, equivalents and alternatives falling within the scope of the invention.

DESCRIPTION OF THE DRAWINGS

The present invention will be understood and appreciated more comprehensively from the following detailed description taken in conjunction with the appended drawings in which:

FIG. 6A is a flowchart of a method for generating a real-time challenges, whereas

Figure 1:
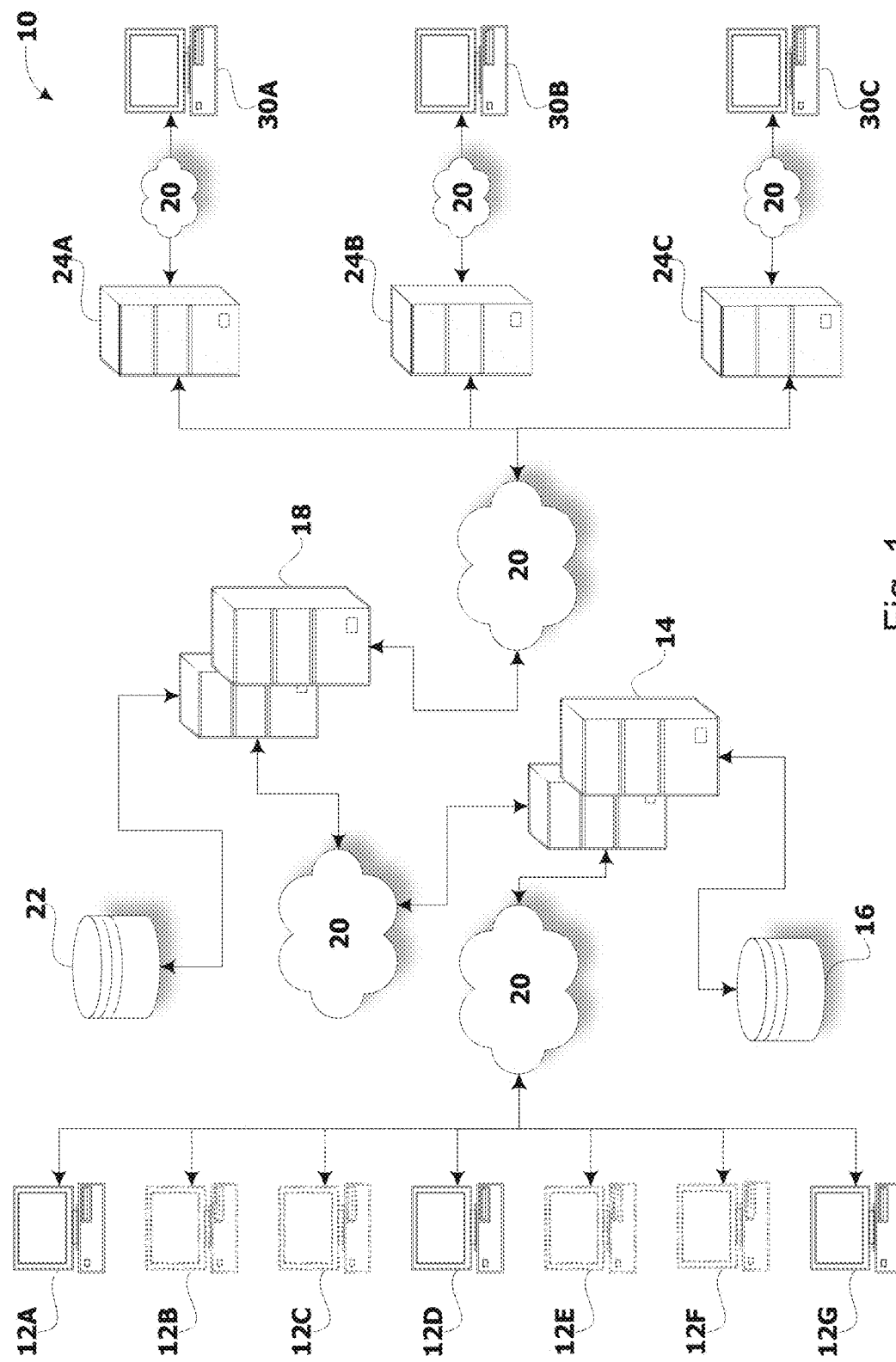
FIG. 1 is a schematic block diagram of an embodiment of the system for real-time responses to messaging user messages using real-time crowd verified NLU service, in accordance with the present invention.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

In accordance with some embodiments of the invention a higher levels of accuracy of real-time automated messaging with a person who has a question or wants to report information is achieved. As real-time automated messaging can obtain better accuracy in understanding user messages, more issues can be addressed or resolved in an automated way and not require human agent to be involved in conversing with the user throughout the messaging session. Recently the use of real-time automated messaging interfaces has increased but even with the latest developments of machine understanding of natural language messages by users there are still many challenges and in many cases machine understanding is limited to very basic intents and data entities that can extracted. Some embodiments invention allow for crowd assisted optimization and verification in critical parts of the conversation which is determining the exact user intent and information so they can be addressed in an automated and systematic way as much as possible.

A preferred embodiment of the invention includes a natural language understanding algorithm as commonly employed by real-time automated messaging interface developers, which returns several possible intents or data entities according to some predefined rank or sort order. This list gets forwarded to the real-time crowd assisted optimization service to efficiently return the most correct answer or interpretation.

In accordance with some embodiments of the invention, using real-time crowd assisted optimization of understanding of a human, a message sent through a real-time automated messaging interface or any other similar real-time communication mechanism where a machine tries to accurately understand natural language and provide an appropriate response. It is up to a specific real-time automated messaging embodiment to take the required action when the real-time crowd assisted intent optimization service is not available or not able to reply in real-time. Real-time response for this invention is the setting of a specific deadline where service response is constraint by. In the preferred embodiment, if the real-time timer elapses no answer will be returned after the deadline but in other embodiments, other factors might determine the default response such as the real-time crowd assisted intent optimization service knowledge base gathered from similar requests from other real-time automated messaging interfaces. There is also a possible embodiment where the real-time crowd assisted intent optimization service is called directly with the user message but such embodiment might be less efficient.

The examples of possible embodiments below are not limiting as to the scope of arrangements of the main components or additional components that may be used to add supporting or utility functions as long as the main concept of the invention of using real-time crowd assisted incoming message understanding optimization and verification service used to improve real-time automated messaging interface performance is realized.

Reference is now made to FIG. 1, showing a schematic block diagram of an embodiment of system 10 for real-time responses to user messaging using real-time crowd verified and NLU service, in accordance with the present invention. System 10 comprises participants computing devices 12A to 12G. Participants computing devices 12A to 12G are operatively connected via internet 20 or some other computer and/or telecommunication network (not shown) to challenge server 14. Participants computing devices 12A to 12G are typically mobile personal type of devices, such as smartphones, tablets, personal digital assistant (PDA) devices or personal portable computers, colloquially also known as notebooks or laptops.

Participants devices 12A to 12G typically include a dedicated software application for receiving messages and/or notifications from challenge server 14. It is noted, however, that general operating system software and/or firmware on participants devices 12A to 12G configured to receive and reply to messages and/or notifications as well as optionally other communication methods, as defined to hereinabove, are likewise applicable. Among participants computing devices 12A to 12G, participants computing devices 12A, 12D and 12G are online and available for active participation in system 10. The computing devices that are online and available for active participation in system 10, such as computing devices 12A, 12D and 12G, are referred to hereunder as the pool of available participants.

Challenge server 14 includes database 16, which stores various entries of metrics relating to the participants. The entries of metrics stored in database 16, primarily characterize the responsiveness of the participants as well as credibility weight of the participants responses. The entries of metrics relating to the responsiveness of the participants optionally include: (i) the average time it took for the a given participant to reply for challenge, (ii) the number of times the given participant has replied to challenges, (iii) the ratio of number of times the given participant has replied to challenges to the total number of challenges and (iv) the average portion of the time the given participant is listed as the pool of available participants, as well as any combination and/or kind of statistical summation thereof. The entries of metrics relating to the credibility weight of the participants responses optionally include: (i) the average of correct responses a given participant had to challenges and (ii) the number of times the given participant had a correct responses, as well as any combination and/or kind of statistical summation thereof.

System 10 further comprises NLP server 18, operatively connected via internet 20 or some other computer and/or telecommunication network (not shown) to challenge server 14. NLP server 18 comprises verified responses database 22. Verified responses database 22 comprises a plurality of responses, which have been previously verified, during offline processing by a pool of participants, related to the incoming message that was the trigger to the verified response. In some preferred examples, database 22 is a relational database, comprising a plurality of incoming messages, which have been verified during offline processing as related or associated to the same response. In other preferred examples, database 22 is a relational database comprising a plurality of responses, which may have been verified as relating or associated to the same incoming message or a group of similar incoming messages.

System 10 further comprises a plurality of conversational agents, such as conversational agents 24A to 24C, operatively connected via internet 20 or some other computer and/or telecommunication network (not shown) to NLP server 18. Conversational agents 24A to 24C, otherwise colloquially known as BOTs, are typically deployed on the servers or hosted on behalf of the business, offering the real-time responses to user messaging using real-time crowd verified and NLU service, in accordance with some embodiments of the present invention, at the website of the business or any computing resource provided by the business. Conversational agents 24A to 24C typically include a database (not shown) including a plurality of definite replies to predefined incoming messages.

System 10 further comprises a plurality of user computers, such as user computers 30A to 30C, operatively connected via internet 20 or some other computer and/or telecommunication network (not shown) to respective conversational agents 24A to 24C. User computers 30A to 30C Participants computing devices 12A to 12G are typically mobile personal type of computing devices, such as smartphones, tablets, personal digital assistant (PDA) devices or personal portable computers, colloquially also known as notebooks or laptops, or stationary computing devices, otherwise known as desktops or work stations.

User computers 30A to 30C comprise a graphical user interface (GUI) configured for displaying a terminal of conversational agents 24A to 24C, respectively. The terminal of conversational agents 24A to 24C displayed on the GUI of user computers 30A to 30C is configured for inputting a text of an incoming messages, such as a question, query or remark. The text of the incoming messages may be inputted into the terminal of conversational agents 24A to 24C by a means of a keyboard, a virtual keyboard, a drawing pad and/or speech-to-text conversation of the dictation of the user, connected to and/or integrated within user computers 30A to 30C.

Figure 2:
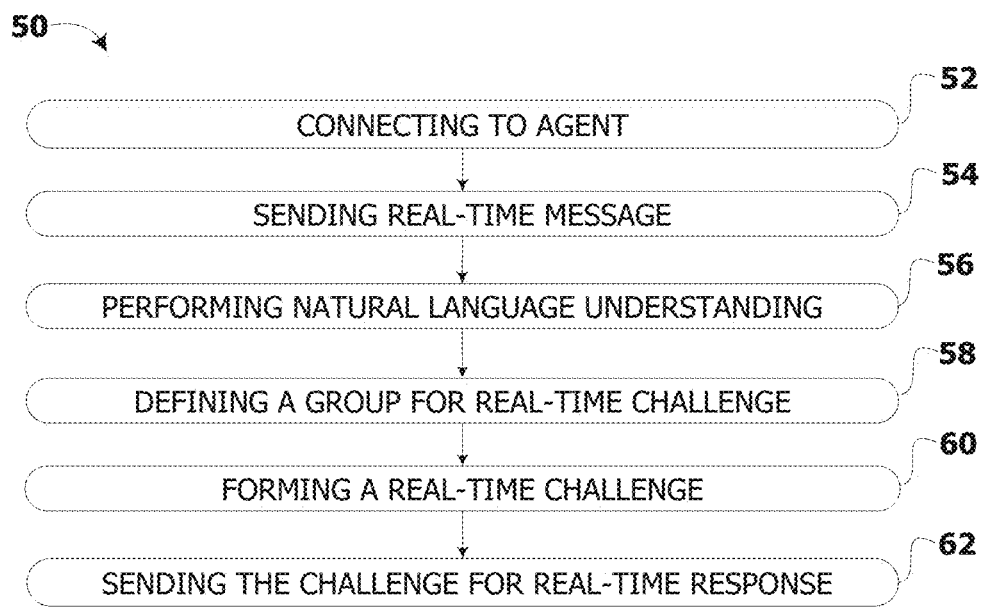
FIG. 2 is a schematic high-level flowchart of a method for providing real-time responses to messaging user messages using real-time crowd verified NLU service, in accordance with an embodiment of the invention.

Reference is now made to FIG. 2, showing a schematic high-level flowchart of method 50 for providing real-time responses to messaging user messages using real-time crowd verified NLU service, in accordance with an embodiment of the invention. Method 50 for commences at step 52 where user, who might be a consumer, looks for customer service and connects to the conversation agent to send a natural language message at step 54 to the real-time messaging interface. The real-time automated messaging interface using natural language understanding (NLU) service determines the meaning of the textual incoming message such as the intent, various data entities, urgency, sentiment etc., at step 56. The currently available NLU technologies may return one or more candidates that may be statistically relevant or a probable meaning of the user intent and data through exact understanding of specific words or word patterns. In currently available technologies the overall accuracy of natural language understanding of is not high where there are many possible options and parameters. To allow the real-time automated messaging to better understand the user intent and data entities, at step 58, the crowd assisted real-time optimization service which takes the best guesses of the natural language understanding service, creates at least one crowd challenge at step 60. Crowd members may respond to the challenge at step 62, whereas the can select the most correct response (not shown).

Figure 3:
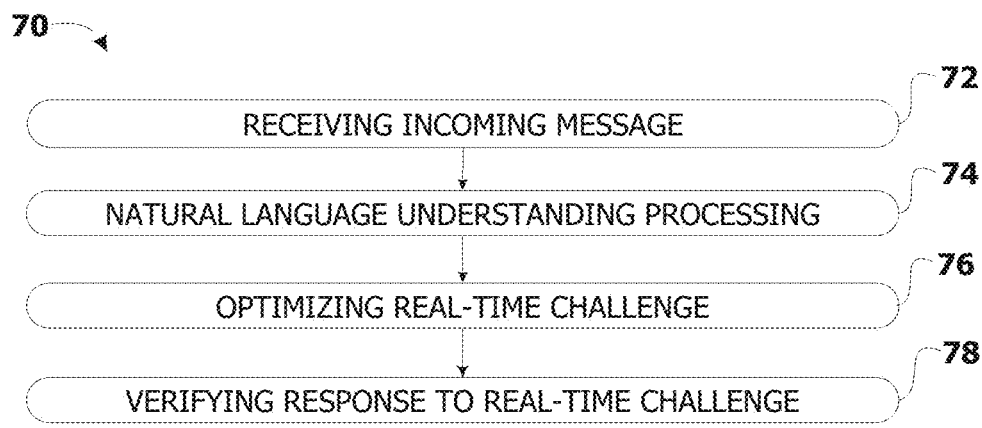
FIG. 3 is a schematic high-level flowchart of a method for real-time responses to user messages are provided using real-time crowd optimization and verification, in accordance with another embodiment of the invention.

Reference is now made to FIG. 3, showing a schematic high-level flowchart of method 70 for real-time responses to user messages provided using real-time crowd optimization and verification, in accordance with another embodiment of the invention. Method 70 elaborates how an incoming message might pass from one component to the next to show an exemplary workflow of an incoming message with the addition of calling the real-time crowd optimization service for verification and an example for a natural language understanding service arrangement embodiment. In this example, the flow starts at step 72 with receiving an incoming message from user. Incoming message from user reaches the real-time automated messaging interface at step 74. NLU Service extracts as much meaningful information as possible to understand the user intent, supplied and implied information. In a preferred embodiment, some natural language understanding service extract information about data entities (specific such as name of a city or date or pattern matched such as email address or URL), sentiment such as if the message includes positive, neutral or negative sentiment, infer the urgency of the user request, and identify the overall goal or intent of the conversation. After the natural language understanding service analyses the incoming message and any other prior messages or other forms of context information, natural language understanding service generates a list of one or more identified elements, usually with a relative certainty score. In many cases, although the combined confidence that the real user intent or supplied value meaning is to a high certainty between the identified candidates, there is a lower certainty in choosing the most accurate one from that list to a high enough probability. For the real-time automated messaging interface, acting on an assumed intent when it is not the real user intents may be frustrating to the user who has to restate his intent repeatedly in different terms until it is understood or request a human live agent to interact with. To raise the confidence in the user intent, the natural language understanding service calls at step 76 crowd assisted real-time optimization service, which uses crowd challenges to have real people vote on the user intent and other information matching challenges. To raise the confidence even more the real-time crowd assisted optimization service might perform yet another call at step 78. Crowd assisted real-time optimization and verification service may repeat the challenge using one or more crowd members to verify the response by means of voting consensus. In the preferred embodiment the real-time crowd assisted optimization service decides based on skill assessment and past interactions of each crowd member in a specific domain when to deploy verification challenges. In other embodiments the real-time crowd assisted optimization verification service may be employed in a different workflow or even not employed at all.

Figure 4:
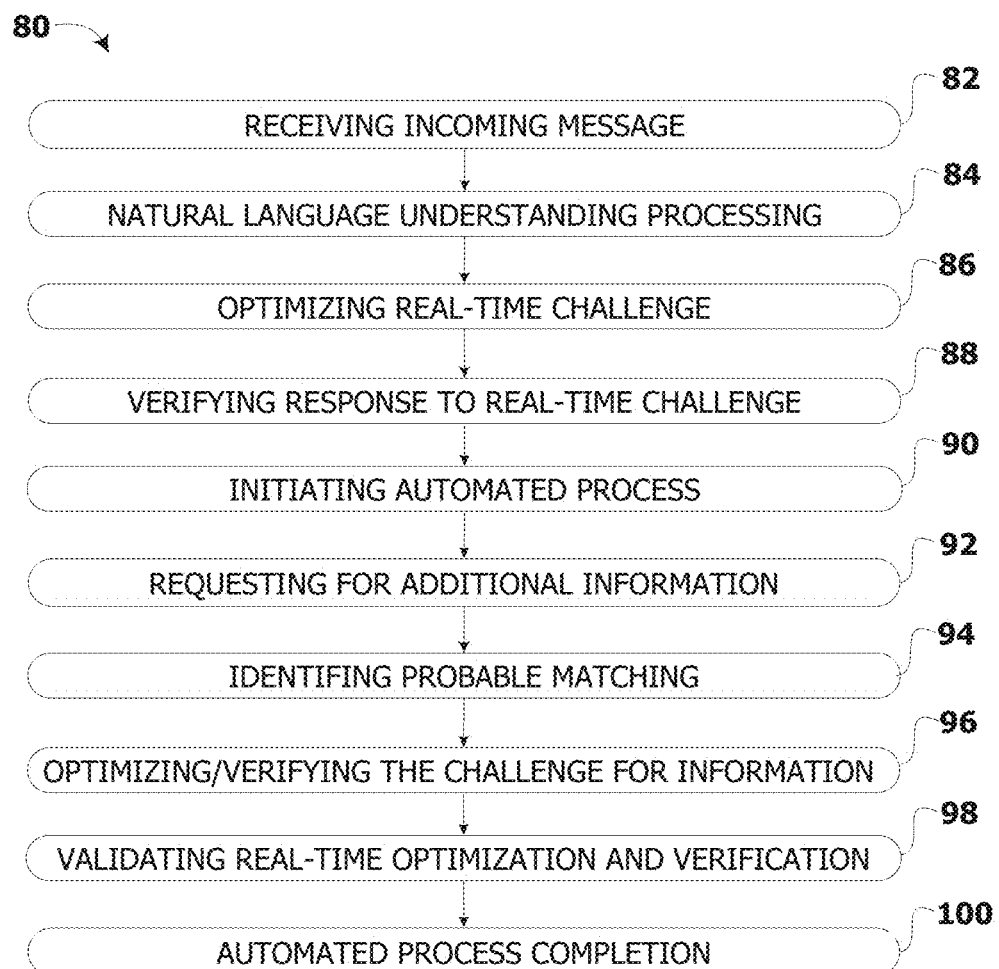
FIG. 4 is a schematic high-level flowchart of a method for real-time responses to user messages using real-time crowd verified intent analysis, in accordance with yet another embodiment of the invention.

Reference is now made to FIG. 4, showing a schematic high-level flowchart of method 80, covering an initial user message and follow-up request for more information and further analysis and verification. In this example, an initial incoming message is received from user at step 82. Initial incoming message from user is then sent to NLU at step 84. NLU identifies at least one probable user intents and extracts related data entities identified. To increase the accuracy of the information and intent extraction, the identified intent, data entities and implied information candidates are sent at step 86 to crowd assisted real-time optimization service. Crowd assisted real-time optimization service then in turn calls at step 88 crowd assisted real-time optimization and verification service crowd assisted real-time optimization and verification service collects additional crowd responses for the same or related challenge to verify to an even higher degree of certainty, the identified intent or extracted or implied information. The real-time automated messaging then uses the identified intent as well as extracted and inferred information to initiate automated process at step 90. Initiated automated process according to its predefined rules for the identified conversation type and specific parameters. The real-time automated messaging interface optionally requests at step 92 additional information from the user and the user may send additional messages that may include the requested information and in some cases additional or alternative intents. The additional incoming messages are again sent to the real-time automated messaging at step 94. NLU service preferably identifies probable matching for user data and expected values and to try and identify if there is a new intent being introduced by the user. The natural language understanding service optionally uses crowd assisted real-time optimization and validation at step 96. Crowd assisted real-time optimization service for information validation throughout the conversation with any additional incoming message that arrives from the user or when the level of certainty of the natural language understanding service results are below a certain threshold. For greater certainty crowd assisted real-time optimization service and verification service may be called at step 98, to increase the level of certainty for the real-time crowd assisted optimization service by using multiple crowd challenges to confirm an assessment of an intent or extracted or implied information extraction. After understanding of the intent of the user is achieved the real-time automated messaging flow is optionally concluded at step 100. Automated process completion at step 100 optionally ask the user if there is another task or question that they wish to communicate about.

Figure 5:
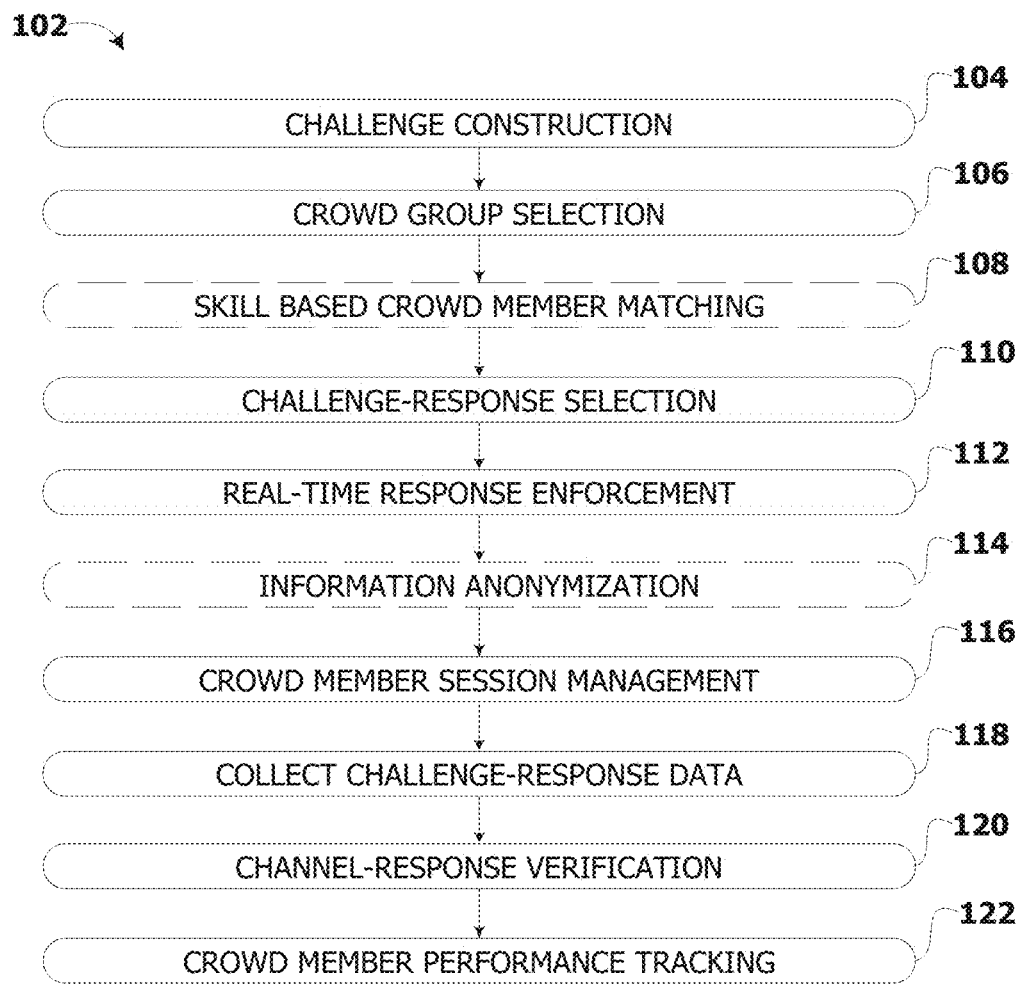
FIG. 5 is a schematic high-level flowchart of a method for real-time responses to user messages using real-time crowd optimization and verification intent analysis, in accordance with still another embodiment of the invention.

Reference is now made to FIG. 5, showing a schematic high-level flowchart of method 102, which is an example of various possible but not limiting steps included in the preferred embodiment of the real-time crowd based intent optimization and verification 104 service. Crowd assisted real-time optimization service 104 uses several related sub-services which perform some of the needed actions for achieving real-time crowd assisted accuracy optimization service for natural language understanding services. These services are examples of the types of services used in the preferred embodiment but other embodiments might include only some of these capabilities and may include additional components or services. As long as there is a real-time use of crowd to increase the certainty of machine understanding of a user incoming message it is still relevant under the currently disclosed system and method. The real-time crowd assisted optimization service performs challenge construction at step 104 to present the needed identification of the most accurate response as a challenge that can be voted on within a short time frame as defined in the challenge-response real-time definition for that specific request from the real-time crowd assisted optimization service. The real-time crowd assisted optimization service preferably utilizes crowd core selection at step 106, where multiple sets of crowd providers or clusters are classified according a quality, cost or other reason to choose one crowd member group over another. In the preferred embodiment, crowd cores or groups are divided by languages, domains, time zones, providers, past performance and cost to name some of the parameters that define each group. Within employed crowd groups, the real-time crowd assisted optimization service uses skill based crowd member matching at step 108, to identify the crowd member who will most likely return the fastest and most accurate response based on current availability status and past performance. The real-time crowd assisted optimization service uses the challenge-response selection at step 110, to pick the most appropriate interface to present the challenge-response user experience to the crowd user. There may be different types of user experiences and interfaces and even the same kinds of experiences which may be tailored to the type of environment, time of day or other criteria.

For example, a user interface may be chosen with high contrast if the crowd user indicated that he or she is outdoors or a multimedia interface that uses text to speech to read out challenges and understand spoken responses if user is unable to interact with the screen at this time. Some interfaces may include a game, whereas others may offer a continuous mode where the crowd member is kept engaged between challenges to keep alert versus other user experiences where the crowd user is prompted for respond for each challenge in real-time. In a preferred embodiment uses a mobile phone application based user experience but other embodiment might use other types of devices such as desktop computers or even TV screens or even non-screen user experiences such as voice based interfaces. The challenge can be a voting challenge between two or more options as in the preferred embodiment but can also in other embodiments be a single button or input action used to vote for or against an option. In other embodiments the crowd participant will be presented with a game where challenges are embedded in the game experience. The real-time crowd assisted optimization preferably perform real-time response enforcement at step 112, to monitor the time constraint of the real-time service and apply the needed logic to take the most appropriate response when there is no response within the allotted timeframe. Some of the possible options include returning an unverified response or not returning a response at all if a certain response cannot be produced on time.

The real-time crowd assisted optimization preferably includes information anonymization at step 114, to replace sensitive or private information according to predefined set of rules with tokens. For example, masking of names, addresses, telephone numbers, credit card information, passport numbers, order numbers etc. This service is responsible for removing any information which may link a message to a specific person or record in an external system. The real-time crowd assisted optimization service preferably further utilizes crowd member session management at step 116, to track crowd member authentication within the real-time crowd assisted optimization service and track his current status and monitor his or her service related actions. The real-time crowd assisted optimization service optionally stores challenge-response data at step 118, to hold the needed information on challenges, possible responses, actual responses and response validation voting. This service also manages the specific crowd member session information and parameters for quality assurance, improvement and tracking purposes. The real-time crowd assisted optimization service preferably performs channel-response verification at step 120, to perform repeated real-time voting on the same challenges and collect multiple responses for the purpose of response accuracy verification. The real-time crowd assisted optimization preferably performs at step 122, crowd member performance tracking to manage and track crowd member past performance and predict future performance accuracy.

Figure 6A:
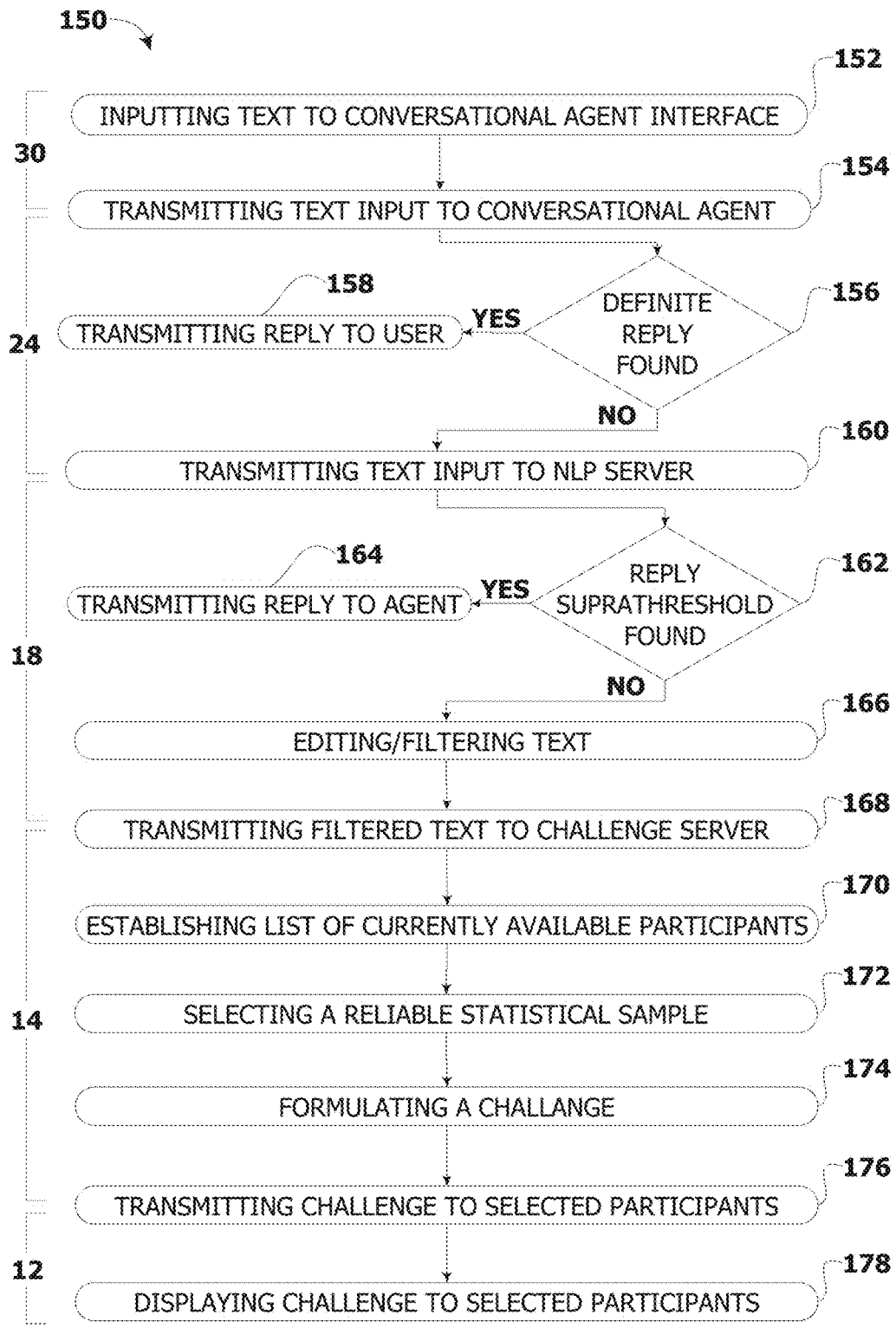
Figure 6B:
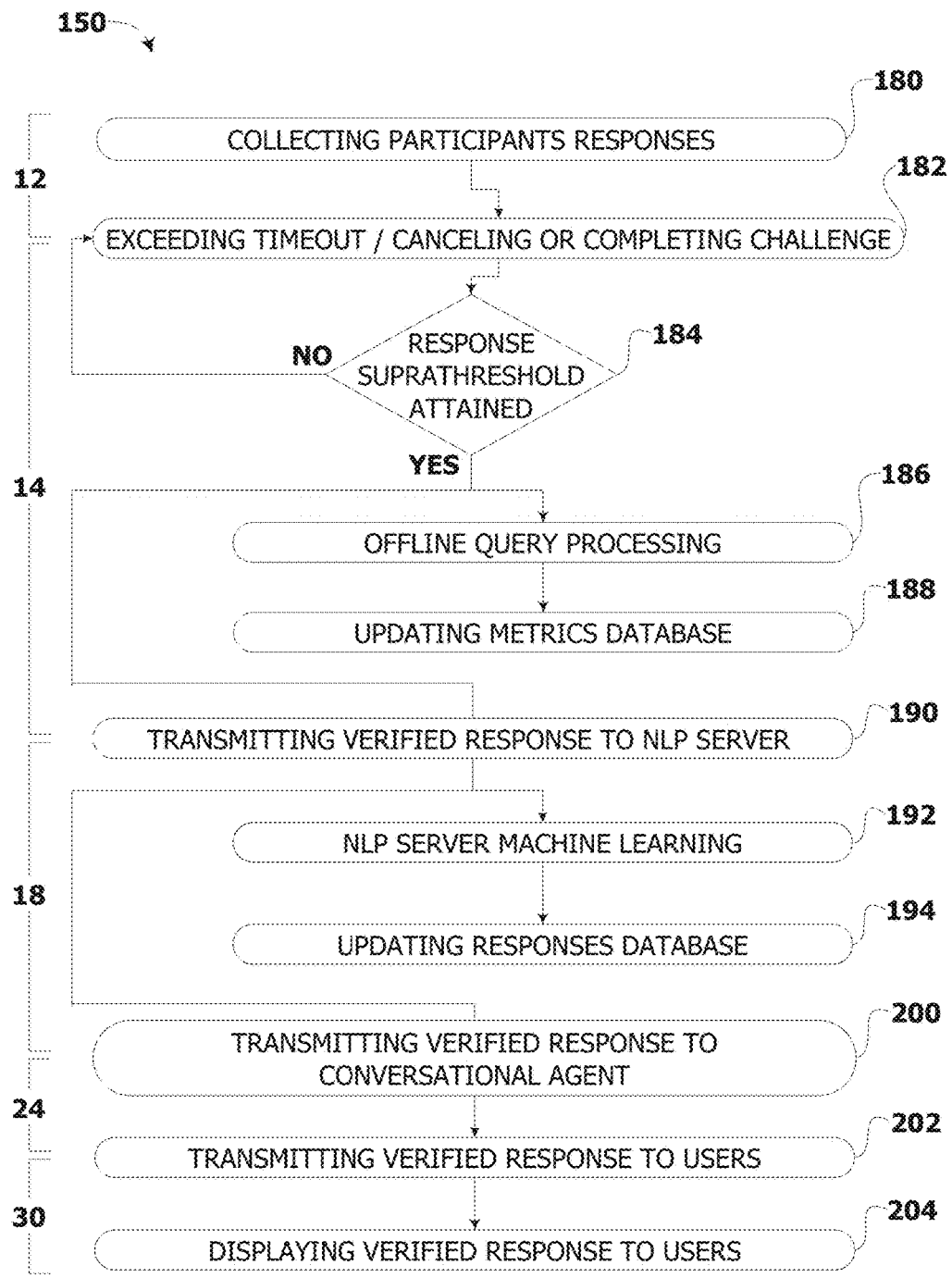
FIG. 6B is a flowchart of a method collecting responses to challenges, of a method using real-time crowd optimization and preferably verification of the responses to challenges, in accordance with a preferred embodiment of the present invention.
Figure 7:
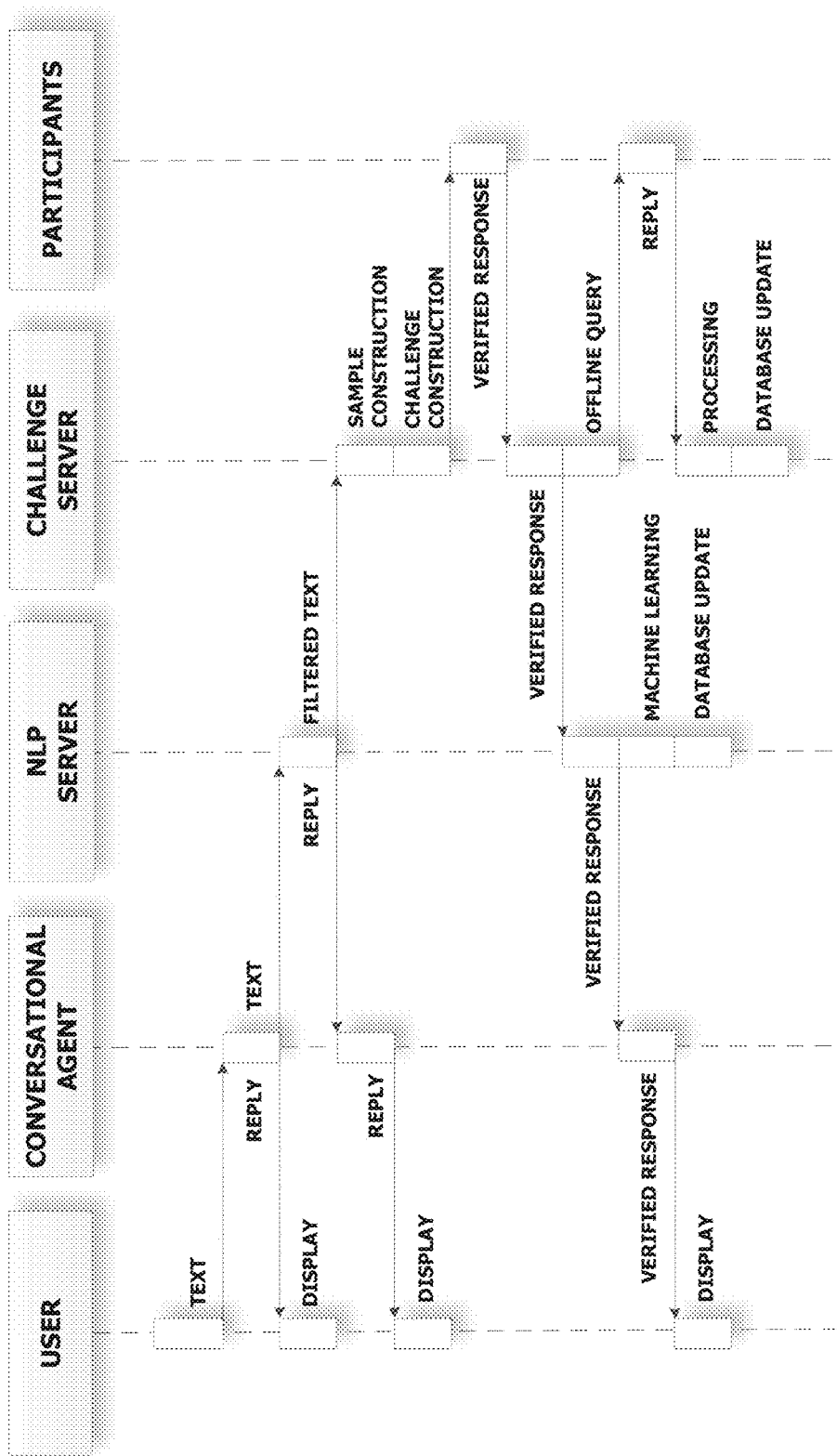
FIG. 7 is a sequence diagram of the interactions and messages for real-time responses to challenges using real-time crowd optimization and preferably verification of the responses, an embodiment of the invention.

Reference is now made to FIGS. 6A and 6B, showing a schematic flowchart of a method for generating a real-time challenges in FIG. 6A and a flowchart of a method collecting responses to challenges in FIG. 6B, of inclusive method 150, shown throughout FIG. 6A and FIG. 6B, using real-time crowd optimization, as well as preferably verification of the responses to challenges, in accordance with a preferred embodiment of the present invention. Reference additionally to FIGS. 6A and 6B is made in combination to FIG. 7, showing a sequence diagram of the interactions and messages for real-time responses to challenges using real-time crowd optimization and preferably verification of the responses, in accordance with a preferred embodiment of the present invention.

Method 150 of using real-time optimization commences at step 152, with inputting and/or collecting the incoming message inputted into the terminal of the conversational agent, displayed on a GUI of a user computer. Then, at step 154, the text of incoming messages inputted and/or collected at step 152, hereinafter referred to as the incoming message, is transmitted, for instance as a message or notification, to the conversational agent.

Subsequently to that, at step 156, the incoming message, transmitted to the conversational agent at step 154, is evaluated by the conversational agent, in accordance with techniques known-in-the-art, of whether a definite reply is found in the database of the conversational agent. It is noted that the evaluation by the conversational agent at step 156 is rather deterministic, requiring a 100% or next to that matching between the incoming message and a predefined message, in the database of the conversational agent. If a definite reply, with a matching of 100% or next to that between the predefined incoming message of the reply and the incoming messages, is found at step 156, the conversational agent transmits such a reply to the terminal of the conversational agent, displayed on a GUI of a user computer, at step 158. Examples of definite replies, with a matching of 100% or next to that between the predefined message of the reply and incoming message, include YES or NO answer to a predefined question or a list of the working hours to a question such as "What are your working hours?". In other examples, the database of the conversational agent stores various forms of greetings, such as "hi", like "hello", "howdy", "hey", "hi there", etc. Such forms of greetings allow 100% categorized identification of a definite reply, such as a reply saying "hi" or another standard greeting, like "Hi, how can I help you?"

If a definite reply, with a matching of 100% or next to that between the predefined message of the reply and the incoming message, is not found at step 156, the conversational agent transmits the incoming message received by the conversational agent at step 154, to the NLP server, at step 160. Then the incoming message received by the NLP server, at step 160, is analyzed by the NLP server at step 162. The analysis of the incoming message by the NLP server at step 162 comprises determining whether a supra-threshold match to a previously verified response, in the verified responses database of the NLP server.

Verified responses database of the NLP server comprises a plurality of messages, the responses to which have been previously verified, during offline processing by a pool of participants, as related to a verified response. In some preferred examples a plurality of incoming messages, which have been previously verified during offline processing as related to or associated with the same response, are screened for matching by the NLP server at step 162, while determining whether a supra-threshold match of a given incoming message to a previously verified response is found in the verified responses database of the NLP server.

In other embodiments the analysis of the incoming message by the NLP server at step 162 comprises determining whether a supra-threshold match to a previously indexed text of a message is found having a verified response associated herewith, in the verified responses database of the NLP server. It is noted that the analysis performed by the NLP server at step 162, for determining whether there is a supra-threshold match of a given incoming message to a verified response or another previously indexed message having a verified response associated herewith, in the verified responses database of the NLP server, is much more flexible and tunable than that performed by the conversational agent at step 156 and requiring a 100% or next to that matching between the incoming message and a predefined message in the database of the conversational agent.

For example, a supra-threshold match to a previously indexed text of a message is found having a verified response associated herewith is optionally achieved by at least one of the following classification tools known-in-the-art as: Python Gensim—similarities library, Python Sklearn—linear_model, Naïe Bayes, decision tree, SGD and/or at least one of the following feature extraction methods known-in-the-art as: Term frequency—inverse document frequency (Tfidf), Bag of words, Linear discriminant analysis (LDA), Latent Semantic Indexing (LSI).

If a reply with supra-threshold matching is found at step 162 by the NLP server, between the incoming message and some other previously indexed message and/or verified reply, in the verified responses database of the NLP server, the NLP server transmits such a reply with supra-threshold matching found at step 162 to the conversational agent, at step 164. If a reply with supra-threshold matching is not found at step 162 by the NLP server, between the incoming message and some other previously indexed message and/or verified reply, in the verified responses database of the NLP server, the NLP server proceeds to step 166, of filtering and/or editing the response, in order to remove and/or censor-out any unacceptable or vulgar language and/or personal details of the user.

Examples of filtering and/or editing the response, in order to remove and/or censor-out any unacceptable or vulgar language and/or personal details of the user performed at step 166 include masking by known-in-the-art tools of filtering possible sensitive or private terms inter glia by use the following tools: Duckling framework, based on wit.ai—to mask temporal expressions and locations, Google geoc-oding api—to identify and mask locations and Google natural language api—to extract other entities.

Then, at step 168, the incoming message filtered and/or edited by the NLP server at step 166, is transmitted to the challenge server. Subsequently to receiving filtered and/or edited incoming message, at step 168, the challenge server at step 170 further establishes an up-to-date list of the active available participants or a pool of the currently available participants. The step of establishing the up-to-date pool of currently available participants is optionally performed by the challenge server at step 170 by a means of different techniques. In some examples, the challenge server actively inquires the computing devices associated with participants registered for participation in the crowd and collects the notifications and/or signals from the inquired computing devices, indicative of the availability of the inquired computing devices to the participation in the next challenge. In other examples, the challenge server retrieves the latest version of the list of computing devices from the database of the challenge server, listed as active for the participation in the next challenge; whereas the list of computing devices listed as active for the participation in the next challenge is compiled and maintained independently by the challenge server in the database of the challenge server, for instance by receiving or collecting periodic notifications from the participant computing devices, indicative of availability of a given participant device and/or the recent activity of a given participant device and/or of last seen activity of a given participant device.

The establishing of an up-to-date list of the active available participants or a pool of the currently available participants performed by the challenge server at step 170, is optionally performed by compiling a list of the available participants in an exemplary manner as follows. When the challenge server gathers all the available participants, it makes a query to the database for all the players with status "online". All players are "offline" by default. A participant is going to a web app that allows getting challenges, and enters to "Online" mode, which is an option in this app. The participant status is saved on a database as "online". When a participant is getting a challenge his database status is changed to "answering". When a participant answered a challenge, or when the challenge time frame expired, the status of the participant is set back to "online". When a participant exits online mode, his status is changed to "offline". When a participant doesn't answer to three straight challenges, his status is changed to "offline".

Upon establishing the up-to-date pool of currently available participants by the challenge server at step 170, the challenge server further at step 172 constructs a statistically reliable sample from the pool of currently available participants establishing at step 170. While constructing a statistically reliable sample from the pool of currently available participants at step 172, challenge server preferably weights at least one of the following parameters: (i) the stream or rate of the incoming messages, (ii) the size of the pool of currently available participants, (iii) the metrics related to the responsiveness of the particular participants in the pool of currently available participants, (iv) the metrics related to the credibility of the particular participants in the pool of currently available participants and/or (v) the reliability or credibility level of the response, as may be set forth or allocated by the conversational agent.

Exemplarily, the constructing of a statistically reliable sample from the pool of currently available participants by the challenge further at step 172 optionally referred to Participant Allocation Function and performed by processing the following parameters:

CPM=Challenges per minute (average for last hour)
Available participants—including both metrics types
AOG=Availability of agents—how many people are waiting for agent response per available agent.

The allocation process is performed by exemplary following commands:
Set APN=available participants number
Set p_resp=Order participants by responsiveness (high to low)
Set p_acc=Order participants by accuracy (high to low)
Set p_size=min (3,max(1,floor(AOG/3+APN*2/CPM)))
Participants_allocated=get first p_size participants from p_resp+first p_size players who are not already added from p_acc Upon constructing a statistically reliable sample from the pool of currently available participants at step 172, the challenge server formulates or constructs a challenge at step 174, to be later transmitted to the participant devices, as will be elaborated infra. A preferred exemplary process of formulating or constructing a challenge, performed by the challenge server at step 174, comprises appending to the filtered and/or edited incoming message, received by the challenge server at step 168, a set of predefined responses, specified a priori by the operator of the challenge server, so that the response of the participating device requires the mere selection of the correct and/or most relevant predefined response. Another exemplary process of formulating or constructing a challenge, performed by the challenge server at step 174, comprises integrating the filtered and/or edited incoming message, received by the challenge server at step 168, in an open question or query sentence, requiring typing-in of the response on the participating device.

An exemplary process of constructing a challenge, by the challenge server at step 174, to the incoming message "I don't want to pay the monthly fee, can you stop my VIP status?", the following options are provided to the participants: Purchase an item, Subscribe to VIP membership, Unsubscribe from VIP membership, Get membership status, Complain about service, Schedule a technician, Return an item and None of the above. Participant should select an option which represents the sentence of the user in the best way. In this case, the right answer would be Unsubscribe from VIP membership.

It should be acknowledged that in some preferred embodiments there is construction of a multiple challenges per singular incoming message, at step 174. Multiple challenges construction, at step 174, is optionally aimed at either clarifying different parts of the incoming message and/or at ensuring an adequate challenge construction by the challenge server. In order to clarify different parts of the same incoming message, such incoming message is typically split into different optionally partially overlapping portions and an individual challenge is constructed by the challenge server at step 174, for each such portion of the incoming message. It is noted that when clarifying different parts of the same incoming message, the splitting of the incoming message into portions is preferably performed so that such portion relates to a point of interest, previously defined by the operator of the challenge server. In order to ensure adequate challenge construction by the challenge server, a portion of interest in the incoming message is typically identified and a plurality of challenges is constructed by the challenge server at step 174, for the very same portion of the incoming message.

Then, the challenge formulated by the challenge server at step 174, is transmitted to the participants devices, at step 176, selected to be included in the statistically reliable sample of available participants pool, constructed by the challenge server at step 172. The challenge formulated by the challenge server at step 174 and transmitted to the participant devices, at step 176, is ultimately displayed to the selected participants, on the GUI of the participants devices, at step 178.

Referring now particularly to FIG. 6B, subsequently to displaying the challenge on the GUI of the participants devices at step 178, the responses of the participants to the challenge, transmitted to the participants devices at step 176, are collected, during step 180. Upon exceeding a preset timeout and/or receiving a response from a particular participant device during step 180 and/or active cancellation of the challenge by the challenge server and/or receiving an indication from a participant that there is no correct response to the given challenge during step 180, the challenge is withdrawn from the participant devices and/or converted to offline processing, as elaborated hereunder, at step 182.

The responses collected by the challenge server, during step 180, are then analyzed by the challenge server during step 184. The analysis performed by the challenge server during step 184 preferably comprises evaluation of whether credibility and/or reliability of the responses, collected at step 180, above a predefined threshold level, among the participants devices included in the statistically reliable sample of available participants pool, constructed by the challenge server at step 172, was indeed attained. Examples of the factors used for determination of whether credibility and/or reliability of the responses, collected at step 180, above a predefined threshold level was indeed attained during step 184, in a non-limiting manner include: (i) the coherence of the responses collected during step 180, (ii) metrics related to the credibility of the participants whose responses collected during step 180 and/or (iii) the reliability or credibility level of the response, as may be set forth or allocated by the conversational agent.

An example of the determination of whether credibility and/or reliability of the responses, collected at step 180, above a predefined threshold level was indeed attained during step 184, in a non-limiting manner includes evaluation of the following Parameters:

LOA=List of answers. Each answer includes the answer id and the participant accuracy metric (% of right answers).

CT=Confidence threshold between 0 to 1

The exemplary validation process includes the following commands:

Set NOA=number of answers given

Set MIN_ACC=NOA*CT

Set BESTA=the LOA answer with highest combined accuracy.

If combined accuracy of BEST>=MIN_ACC, return id for BESTA.

Return False—if no answer found.

It is noted that if a plurality of challenges is constructed by the challenge server at step 174, for the very same portion of the incoming message, in order to ensure adequate challenge construction by the challenge server, the analysis performed by the challenge server during step 184 typically comprises statistical comparison between the sets of responses to the different challenges collected at step 180 and selecting a verified response to the particular challenge, characterized by a higher statistical significance.

If a statistically acceptable level of credibility and/or reliability of the responses, collected at step 180, is attained during step 184, the verified response characterized by a supra-threshold level of credibility and/or reliability is transmitted to the NLP server at step 190. If a statistically acceptable level of credibility and/or reliability of the responses, collected at step 180, was not attained during step 182, challenge server is optionally continues to collect responses from the participant devices by iteratively performing step 180, until exceeding a preset timeout and/or receiving sufficient responses and/or active cancellation of the challenge by the challenge server and/or receiving an indication from a participant that there is no correct response to the given challenge and/or otherwise the challenge is withdrawn from the participant devices and/or converted to offline processing, as elaborated hereunder, during iterative performance of step 182.

Additionally or alternatively upon attaining a statistically acceptable level of credibility and/or reliability of the responses, collected at step 180, during step 184, the verified response characterized by a supra-threshold level of credibility and/or reliability is subjected to offline processing, during step 186. During the offline processing of step 186, a challenge previously distributed among the participant devices of a statistically reliable sample from available participants pool, constructed by the challenge server at step 172, which has attained a statistically acceptable level of credibility and/or reliability of the response at step 184 but for which the score of statistical significance of the verification by the crowd of the participants of aforesaid statistically reliable sample selected from participants pool needs to be improved, is redistributed to a significantly larger group of participants devices, typically not in a real time regime, from which the participant devices of the original statistically reliable sample are typically excluded.

An example of the offline processing at step 186 includes an Instant Validation Knockout Process, using the following parameters:

LOA=List of answers. Each answer includes the answer id and the participant accuracy metric (% of right answers)

CT=Confidence threshold between 0 to 1

PN=Total participants in the challenge

Whereas the offline validation process exemplary includes the following commands:

Set MIN_ACC=PN*CT

Set BESTA=the LOA answer with highest combined accuracy.

If combined accuracy of BESTA>=MIN_ACC, return id for BESTA.

Return False—no answer found yet.

The challenge redistributed during the offline processing of step 186, to a significantly larger group of participants devices, is preferably redistributed until sufficient statistical significance of the verification by the larger crowd of participants is attained. Consequently, upon attaining sufficient statistical significance of the verification by the larger crowd, the metrics of the participants in the original statistically reliable sample are updated, in the database of the challenge server, in view of the correct response re-verified by the larger crowd, at step 188. Alternatively or additionally, upon attaining sufficient statistical significance of the verification by the larger crowd, the metrics of the participants in the larger crowd, used for re-verification of the response, are updated, in the database of the challenge server, at step 188.

An exemplary process of updating the metrics in the database of the challenge server, at step 188, includes sending a challenge to a large group of participants, in several cycles (not simultaneously) to at least 20 participants in each group. Then, a validation function tests the statistically reliable answer. Let's say answer "4" is validated. In a participant trace database, all participants who selected "4" has their "correct_answer_counter" metric increased by 1. All participants who selected another option has their "incorrect_answer_counter" metric increased by 1. All participants who got the challenge but didn't answer at all has their "timout_counter" metric increased by 1.

The verified response characterized by a supra-threshold level of credibility and/or reliability, transmitted to the NLP server at step 190, after attaining statistically acceptable level of credibility and/or reliability of the response during step 184, is further forwarded to the conversational agent at step 200. Additionally or alternatively after transmitting the verified response characterized by a supra-threshold level of credibility and/or reliability to the NLP server at step 190, the NLP server performs machine learning at step 192. The machine learning performed by the NLP server at step 192 typically includes improving and perfecting the ability of the NLP server to better match the incoming message, by the NLP server at step 162, to another previously indexed message and/or a verified response, in the verified responses database of the NLP server. The machine learning performed by the NLP server at step 192 optionally further includes improving and perfecting the ability of the NLP server to match the incoming message, by the NLP server at step 162, to previously indexed messages and/or a verified responses, in the verified responses database of the NLP server, characterized by larger variability. Upon completing the machine learning at step 192, the verified responses database of the NLP server is typically updated, at step 194, with at least one additional message, having a verified response associated herewith, as well as preferably various parameters used for matching the incoming message, by the NLP server at step 162, to another previously indexed message and/or a verified response, in the verified responses database of the NLP server.

An example of improved learning by the NLP server at step 162, is performed as follows: a response received with high credibility is saved to the database and allows enriching the feature matrix used by the feature extraction methods, such as Bag-of-words, tfidf, LSI and LDA. This has the potential to improve the finding of the right predefined option that suits a new response, after training the model. The training is using, for example, classification methods found in Python libraries gensim and sklearn.

For example, an incoming message "I'm sick so can't fly as planned" is mapped reliably to the option "Cancel flight". All the response words will have higher value in the feature matrix related to the "Cancel flight" option. Therefore, after training a future response with the word "sick", will have a better chance of being identified as "Cancel flight". Thus in the instance of the following sentence "I have a scheduled flight, but I'm sick. What can I do?", finding "Cancel flight" would show great understanding even though it wasn't asked for explicitly.

The verified response, characterized by a supra-threshold level of credibility and/or reliability, forwarded to the conversational agent at step 200, is further transmitted to the respective user computing device at step 202. The verified response with supra-threshold credibility and/or reliability level, transmitted to the user computing device at step 202, is eventually displayed and/or dictated out vocally to the user from the user computing device at step 204.

Figure 8:
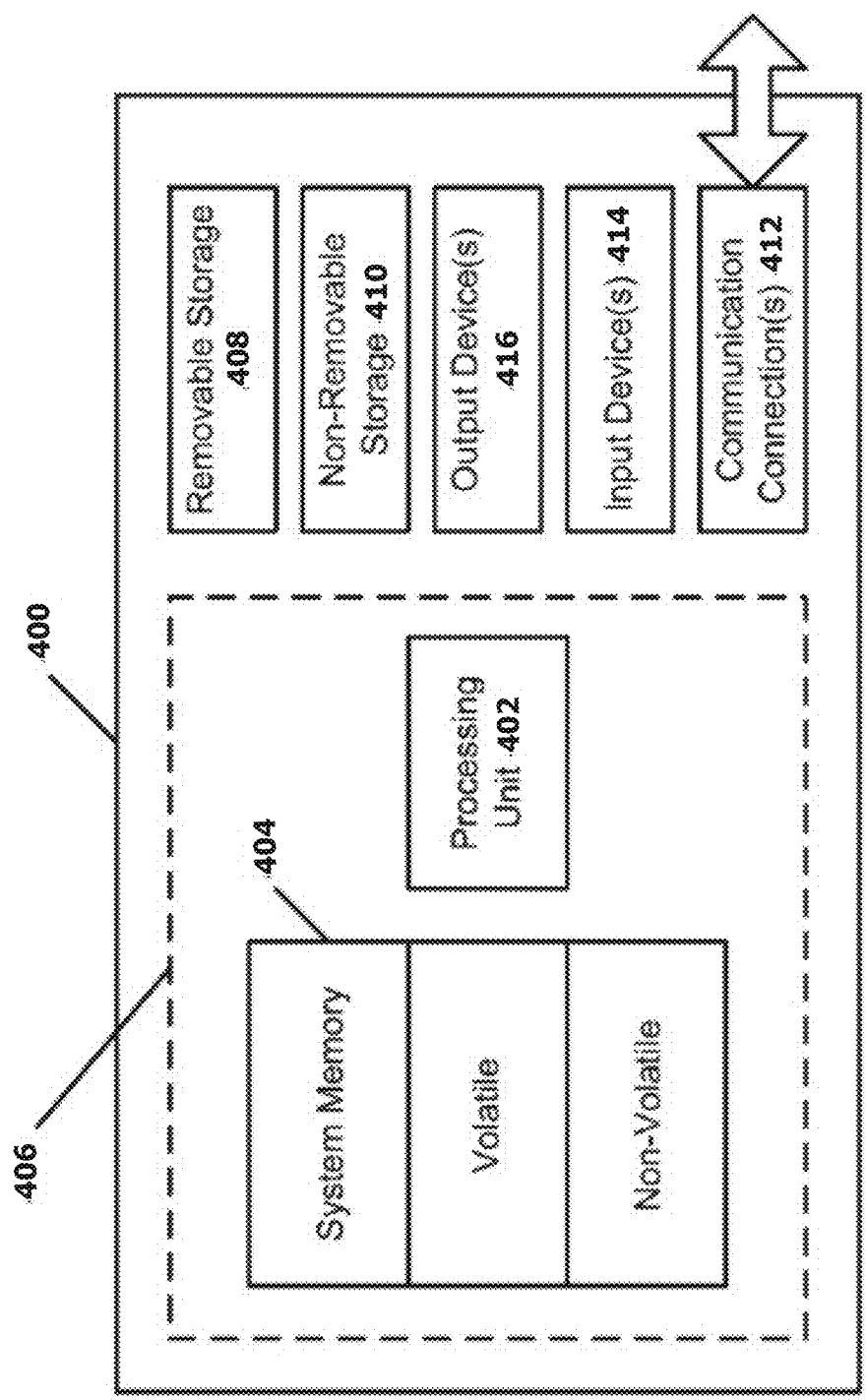
FIG. 8 is a schematic diagram of an exemplary computing environment.

With reference to FIG. 8, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile, such as random access memory (RAM), non-volatile (such as read-only memory (ROM), flash memory, etc.), or some combination of the two. This most basic configuration is illustrated in FIG. 8 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 8 by removable storage 408 and non-removable storage 410.

Computing device 400 typically includes a variety of computer readable media. Computer readable media can be any available media that can be accessed by computing device 400 and include both volatile and non-volatile media, and removable and non-removable media. Computer storage media include volatile and non-volatile, and removable and non-removable media implemented in any method or technology for storage of information such as computer readable instructions, data structures, program modules or other data.

Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

BIBLIOGRAPHICAL LITERATURE CITATION LIST

Patent Literature

U.S. Pat. Nos. 9,280,610, 8,918,354, 9,224,152 and 6,434,549.
US patent applications: US20140162241, US20140129651, US20150269586, US20130066693, US20140019435, US20100161592, US20130006637, US20130290342, US20160225370, US20140129651, US20090245500, US20160099892, US20120158620 and US20160253313.

Non Patent Literature

Duckling framework, based on wit.ai—available at https://duckling.wit.ai
Google geocoding api—available at https://developers.google.com/maps/documentation/geocoding/start
Google natural language api—available at https://cloud.google.com/natural-language!
Python Gensim, Document similarity queries—available at https://radimrehurek.com/gensim/similarities/docsim.html
Python Sklearn, linear_model—available at http://scikit-learn.org/stable/modules/generated/sklearn.linear_model.LinearRegression.html
Naïve Bayes classifier—available at http://scikit-learn.org/stable/modules/naive_bayes.html
Decision Trees (DTs)—available at http://scikit-learn.org/stable/modules/tree.html
Stochastic Gradient Descent (SGD)—available at http://scikit-learn.org/stable/modules/sgd.html
Wikipedia contributors. "Tf-idf." Wikipedia, The Free Encyclopedia. Wikipedia, The Free Encyclopedia, 2 Aug. 2017. Retrieved. 13 Sep. 2017 from https://en.wikipedia.org/wiki/Tf-idf
Wikipedia contributors. "Bag-of-words model." Wikipedia, The Free Encyclopedia. Wikipedia, The Free Encyclopedia, 8 Sep. 2017. Retrieved 13 Sep. 2017 from https://en.wikipedia.org/wiki/Bag-of-words_model
Wikipedia contributors. "Linear discriminant analysis." Wikipedia, The Free Encyclopedia. Wikipedia, 3 Sep. 2017. Retrieved. 13 Sep. 2017 from https://en.wikipedia.org/wiki/Linear_discriminant_analysis
Wikipedia contributors. "Latent semantic analysis." Wikipedia, The Free Encyclopedia. Wikipedia, The Free Encyclopedia, 2 Sep. 2017. Retrieved. 13 Sep. 2017 from https://en.wikipedia.org/wiki/Latent_semantic_analysis It will be appreciated by persons skilled in the art that the present invention is not limited to what has been particularly shown and described herein above. Rather the scope of the invention is defined by the claims which follow:

The invention claimed is:
1. A system for operating a real-time automated conversational agent, characterized by human crowd verified responses, said system comprises:
(a) at least one user computing device comprising:
(I) a micro-processor programmable to operate a terminal of a conversational agent;
(II) at least one input/output (I/O) hardware component configured to:
(i) provide an incoming message collected at said terminal;
(ii) communicate a verified response to said user;
(III) a communication port configured to:
(i) transmit said incoming message collected at said terminal to a conversational agent;
(ii) receive said verified response communicable to said user, from a conversational agent;
(b) at least one conversational agent, operatively connected to said at least one user computing device, said at least one conversational agent comprising:
(I) a computer-readable storage medium configured to store a plurality of definite replies;
(II) a micro-processor programmable to determine whether there is a definite reply among said plurality of definite replies that matches said incoming message;
(III) a communication port configured to:
(i) transmit said incoming message from said conversational agent;
(ii) to receive said verified response by said conversational agent;
(iii) transmit said verified response from said conversational agent to said at least one user computing device;

(c) at least one natural language programming (NLP) server, operatively connected to said at least one conversational agent, said at least one NLP server comprising:
  (I) a computer-readable storage medium configured to store:
    (i) a plurality of verified responses;
    (ii) at least one set of rules for determining whether there is a verified response among said plurality of verified responses that matches said incoming message with a matching score above a predefined matching score threshold;
    (iii) at least one set of rules for censoring and/or filtering said incoming message;
  (II) a micro-processor programmable to:
    (i) determine whether there is a verified response among said plurality of verified responses that matches said incoming message with a matching score above a predefined matching score threshold, according to said at least one set of rules for determining;
    (ii) censor and/or filter said incoming message, according to said at least one set of rules for censoring and/or filtering;
  (III) a communication port configured to:
    (i) transmit a censored/filtered incoming message from said at least one NLP server;
    (ii) receive said verified response by said at least one NLP server;
    (iii) transmit said verified response to said at least one conversational agent;
(d) at least one challenge server, operatively connected to said at least one NLP server, said at least one challenge server comprising:
  (I) a computer-readable storage medium configured to store:
    (i) a list of currently available participants;
    (ii) metrics of registered participants;
    (iii) at least one set of rules for constructing a statistically reliable sample;
    (iv) a plurality of optional/non-verified responses;
    (v) at least one set of rules for constructing a challenge;
  (II) a micro-processor programmable to:
    (i) construct a statistically reliable sample from said list of currently available participants, according to said at least one set of rules for constructing said statistically reliable sample;
    (ii) construct a challenge from said censored/filtered incoming message and plurality of optional/non-verified responses, according to said at least one set of rules for constructing said challenge;
  (III) a communication port configured to:
    (i) receive said censored/filtered incoming message from said at least one NLP server;
    (ii) transmit said challenge from said at least one challenge server;
    (iii) receive responses to said challenge;
    (iv) transmit said verified response to said at least one NLP server;
(e) a plurality of participant computing devices, operatively connected to said at least one challenge server, each one of said plurality of participant computing devices comprising:
  (I) at least one input/output (I/O) hardware component configured to detect a response to said challenge;
  (II) a communication port configured to:
    (i) receive said challenge from said at least one challenge server;
    (ii) transmit said response to said challenge, to said at least one challenge server.

2. The system for operating a real-time automated conversational agent, as in claim 1, wherein said at least one input/output (I/O) hardware component is selected from the group consisting of: a graphical user interface (GUI), a voice user interfaces (VUI), a display, a screen touch, a computer keyboard, a virtual keyboard, a drawing pad, a speech-to-text conversation engine, a microphone, a computer pointing device.

3. The system for operating a real-time automated conversational agent, as in claim 1, wherein said computer-readable storage medium of said challenge server is further configured to store a set of rules for determining that said responses collected by said challenge server attain credibility above a predefined threshold level.

4. The system for operating a real-time automated conversational agent, as in claim 1, wherein said computer-readable storage medium of said challenge server is further configured to store a set of rules for conducting an offline non-real-time challenge, to a group of participants larger than said statistically reliable sample, in order to re-verify said credibility of said verified response among said larger group of participants.

5. The system for operating a real-time automated conversational agent, as in claim 1, wherein said computer-readable storage medium of said challenge server is further configured to store a set of rules for recalculating said metrics of said registered participants.

6. The system for operating a real-time automated conversational agent, as in claim 1, wherein said NLP server is further configured to perform machine learning of said verified responses.

7. The system for operating a real-time automated conversational agent, as in claim 1, wherein said NLP server is further configured for updating said computer-readable storage medium of said NLP server with said verified responses.

8. The system for operating a real-time automated conversational agent, as in claim 1, wherein said set of rules for constructing said challenge on said computer-readable storage medium of said challenge server further comprises a set of rules for construction of multiple challenges for ensuring adequate challenge construction by said challenge server, wherein a portion of interest in said incoming message is identified and a plurality of challenges is constructed by said challenge server.

* * * * *